United States Patent
Ajanee et al.

(10) Patent No.: US 11,674,263 B2
(45) Date of Patent: Jun. 13, 2023

(54) DYE SUBLIMATION INKS FOR PRINTING ON NATURAL FABRICS

(71) Applicant: Prism Inks, Inc., Sunnyvale, CA (US)

(72) Inventors: Amir A. Ajanee, Saratoga, CA (US); Graham A. Dracup, Soquel, CA (US); Carlos J. Hernandez, San Jose, CA (US); Travis T. Calhoun, San Jose, CA (US)

(73) Assignee: Prism Inks, Inc., Sunnyvale, CA (US)

( * ) Notice: Subject to any disclaimer, the term of this patent is extended or adjusted under 35 U.S.C. 154(b) by 253 days.

(21) Appl. No.: 17/125,740

(22) Filed: Dec. 17, 2020

(65) Prior Publication Data

US 2021/0180248 A1  Jun. 17, 2021

Related U.S. Application Data

(60) Provisional application No. 62/949,178, filed on Dec. 17, 2019.

(51) Int. Cl.

| *D06P 5/30* | (2006.01) |
| *C09D 11/328* | (2014.01) |
| *C09D 11/322* | (2014.01) |
| *D06P 5/28* | (2006.01) |
| *D06P 1/16* | (2006.01) |
| *D06M 13/148* | (2006.01) |
| *D06M 16/00* | (2006.01) |
| *D06P 1/52* | (2006.01) |
| *D06M 101/02* | (2006.01) |

(52) U.S. Cl.
CPC .............. *D06P 5/30* (2013.01); *C09D 11/322* (2013.01); *C09D 11/328* (2013.01); *D06M 13/148* (2013.01); *D06M 16/00* (2013.01); *D06P 1/16* (2013.01); *D06P 1/5285* (2013.01); *D06P 5/004* (2013.01); *D06M 2101/02* (2013.01)

(58) Field of Classification Search
CPC .. D06P 5/30; D06P 1/16; D06P 1/5285; D06P 5/004; C09D 11/322; C09D 11/328; C09D 11/10; C09D 11/102; C09D 11/38; D06M 13/148; D06M 16/00; D06M 2101/02
USPC ............................................. 8/471, 472, 473
See application file for complete search history.

(56) References Cited

U.S. PATENT DOCUMENTS

| 4,119,398 | A | 10/1978 | Purser |
| 4,210,412 | A | 7/1980 | Yamane et al. |
| 4,365,966 | A | 12/1982 | Bruno et al. |
| 4,492,584 | A | 1/1985 | Jenkins |
| 4,576,610 | A | 3/1986 | Donenfeld |
| 4,910,292 | A | 3/1990 | Blount |
| 5,008,239 | A * | 4/1991 | Donenfeld ............ B41M 5/0356 503/227 |
| 5,015,261 | A | 5/1991 | Donenfeld et al. |
| 5,734,396 | A | 3/1998 | Hale et al. |
| 5,753,367 | A | 5/1998 | Takemura et al. |
| 7,081,324 | B1 | 7/2006 | Hare et al. |
| 9,346,932 | B2 | 5/2016 | Liu et al. |
| 2007/0011819 | A1 | 1/2007 | DeVries et al. |
| 2007/0103529 | A1 | 5/2007 | Pearl et al. |
| 2011/0102497 | A1 | 5/2011 | Sato et al. |
| 2011/0169901 | A1 | 7/2011 | Pinto et al. |
| 2014/0125746 | A1 | 5/2014 | Ohnishi |
| 2017/0058453 | A1* | 3/2017 | Pan ........................ D06P 5/2072 |
| 2021/0040684 | A1 | 2/2021 | Ajanee et al. |

FOREIGN PATENT DOCUMENTS

| EP | 2423 276 A1 * | 2/2012 | ............. C09D 11/00 |
| WO | 2018/078634 A1 | 5/2018 | |
| WO | WO 2018/078634 A1 * | 5/2018 | |
| WO | 2019/094008 A1 | 5/2019 | |
| WO | WO 2019/094008 A1 * | 5/2019 | ................ B41J 2/05 |
| WO | WO2019203793 A1 * | 10/2019 | .............. B41J 2/475 |

OTHER PUBLICATIONS

International Search Report and Written Opinion dated Oct. 27, 2020, directed to International Application No. PCT/US2020/045388; 16 pages.

Chang et al., (Jun. 2011). "Microemulsion Polymerization of Microlatex in Sublimation Ink for Cotton Fabric Ink Jet Printing," Journal of Applied Polymer Science, 122:1872-1881.

International Search Report and Written Opinion dated Mar. 18, 2021, directed to International Application No. PCT/US2020/065599; 15 pages.

* cited by examiner

Primary Examiner — Eisa B Elhilo
(74) Attorney, Agent, or Firm — Morrison & Foerster LLP

(57) ABSTRACT

Provided are dye sublimation ink compositions, methods of preparing dye sublimation ink compositions, and methods of printing with dye sublimation ink compositions. Methods of printing with dye sublimation ink compositions includes printing on natural fabrics. Dye sublimation ink compositions comprise one or more latexes; a humectant composition; a surfactant composition; a biocide composition; a buffer composition; and a solvent.

27 Claims, No Drawings

DYE SUBLIMATION INKS FOR PRINTING ON NATURAL FABRICS

CROSS-REFERENCE TO RELATED APPLICATIONS

This application claims the benefit of U.S. Provisional Application No. 62/949,178, filed Dec. 17, 2019, the entire contents of which are incorporated herein by reference.

FIELD OF THE INVENTION

This disclosure relates to processes for printing on natural fabrics. Specifically, this disclosure relates to processes for sublimation ink transfer and direct printing processes for natural fabrics.

BACKGROUND OF THE INVENTION

Printed fabrics are useful for several different products including, but not limited to, clothing, bedding, window treatments, signage, upholstery, etc. Printing onto fabrics allows for a variety of patterns and designs to be used on the fabric.

Presently, dye sublimation inks are often used for printing on synthetic fabrics only (e.g., polyester fabrics, polyester signs) due to their ability to penetrate the fiber, their color vibrancy, their crock testing results, and their colorfastness to laundering. However, dye sublimation inks are typically not suitable for printing on natural fiber fabrics (e.g., cotton, wool, silk) because the dyes penetrate and do not adhere to the natural fibers. This lack of adhesion can cause bleeding during laundering, a reduction in color density, a decrease in colorfastness to laundering, and a decrease in the crock of the printed fabric.

SUMMARY OF THE INVENTION

Provided are dye sublimation inks suitable for printing on natural fabrics and synthetic fabrics. Also provided are methods of printing on natural fabrics and synthetic fabrics using dye sublimation inks in a dye sublimation printing process. In particular, dye sublimation inks provided herein comprise a latex that improves the color density of the ink by creating a polymeric layer that the dye can absorb into and better adhere to the fabric. Thus, dye sublimation ink compositions comprising latex provided herein may be used to print onto fabrics comprising natural fibers to achieve printed images of various color densities. Additionally, dye sublimation inks provided herein can improve the versatility of the dye, since users can use a single dye sublimation ink composition to print onto both synthetic and natural fabrics.

Typically, dye sublimation inks are only suitable for printing on synthetic fabrics. Synthetic fabrics are hydrophobic, allowing for better absorption of dye sublimation inks as compared to hydrophilic natural fabrics.

Currently though, there does exist some dye sublimation inks that can be transferred onto natural fabrics (e.g., cotton.) Processes using these inks require a user to digitally print an image onto a coated film and transfer the image to the fabric using a heat press. However, this process is only compatible with 100% density color images, the thickness of the coated film causes poor hand, the tested colorfastness to laundering is poor, and there is a reduction in the elasticity or elongation of the fabric.

However, printing onto natural fabrics using dye sublimation inks comprising latex provided herein can eliminate some of the restrictions and undesirable characteristics of current dye sublimation inks provided above. For example, dye sublimation inks provided herein can be used to print not only to natural fabrics, but also synthetic fabrics, which increases the versatility of the ink. These inks can be printed on pretreated natural fabrics, which may further improve the properties of the printed image. However, pretreatment may not be necessary to achieve printed images on natural fabrics Dye sublimation inks provided herein can comprise water, humectants, surfactants, additives, and colorants. Dye sublimation inks provided herein also comprise a latex, whose addition in the dye sublimation ink prevents the dye from completely penetrating through the fibers (and thus, not adhering to the fibers of the fabric). The addition of the latex in the dye sublimation ink also improves the washability of the ink when printed onto natural fabrics. Compared to other inks, such as pigment-based direct-to-garment inks, dye sublimation inks provided herein have the ability to print or transfer to PET as well as print directly to natural fabrics. As explained in detail below, disclosed dye sublimation inks may be printed onto fabrics (e.g., natural fabrics) using either of two methods: (1) they can be directly printed on to the fabric; or (2) they can be printed onto a sheet and heat transferred to the fabric in a two-step process. Further, the dye sublimation inks provided herein may be printed on both natural fabrics and synthetic fabrics.

In some embodiments, a dye sublimation ink composition for printing on a fabric comprising natural fibers is provided, the composition comprising: 5 to 40 wt. % one or more latexes; and a pigment composition.

In some embodiments of the composition, the fabric comprises one or more of wool, cotton, silk, linen, leather, hemp, or bamboo.

In some embodiments of the composition, the fabric comprises synthetic fibers.

In some embodiments of the composition, the fabric comprises a pretreated fabric.

In some embodiments of the composition, the fabric comprises 8 to 15 grams of a pretreatment composition per square inch of natural fiber fabric, wherein the pretreatment composition comprises: 18 to 40 wt. % one or more latex polymers; 0.5 to 5 wt. % coalescing agent composition; 0.1 to 3 wt. % surfactant composition; 0.5 to 5 wt. % ultraviolet (UV) stabilizer composition; 0.5 to 5 wt. % antioxidant composition; and 40 to 75 wt. % solvent.

In some embodiments of the composition, the one or more latexes of the dye sublimation ink composition comprises one or more of a polyester, an acrylic, an aramid, a chlorinated polymer, an elastane, an elastodiene, a fluorinated polymer, a polyurethane, a polyvinyl chloride, a polyolefin, a polystyrene, an acrylonitrile butadiene styrene, a polyacetate, a polyamide, a polyethylene, a polyimide, a polyether, a polycarbonate, or a polyvinylalcohol.

In some embodiments of the composition, the one or more latexes of the dye sublimation ink composition comprises a polyurethane latex.

In some embodiments of the composition, the composition comprises 1 to 25 wt. % humectant composition.

In some embodiments of the composition, the humectant composition comprises one or more of dipropylene glycol, diethylene glycol, triethylene glycol, and glycerine.

In some embodiments of the composition, the humectant composition comprises glycerine.

In some embodiments of the composition, the composition comprises 0.01 to 3 wt. % surfactant composition.

In some embodiments of the composition, the surfactant composition comprises an anionic or a nonionic surfactant.

In some embodiments of the composition, the composition comprises 0.1 to 3 wt. % biocide composition.

In some embodiments of the composition, the biocide composition comprises an antimicrobial.

In some embodiments of the composition, the composition comprises 0.1 to 3 wt. % buffer composition.

In some embodiments of the composition, the buffer solution comprises triethanol amine.

In some embodiments of the composition, the composition comprises 30 to 50 wt. % solvent.

In some embodiments of the composition, the solvent comprises water.

In some embodiments, a dye sublimation ink composition is provided, the composition comprising: 5 to 40 wt. % one or more latexes; 1 to 25 wt. % humectant composition; 0.01 to 3 wt. % surfactant composition; 0.1 to 3 wt. % biocide composition; 0.1 to 3 wt. % buffer composition; 30 to 50 wt. % solvent; and a pigment.

In some embodiments of the composition, the one or more latexes comprise one or more of a polyester, an acrylic, an aramid, a chlorinated polymer, an elastane, an elastodiene, a fluorinated polymer, a polyurethane, a polyvinyl chloride, a polyolefin, a polystyrene, an acrylonitrile butadiene styrene, a polyacetate, a polyamide, a polyethylene, a polyimide, a polyether, a polycarbonate, or a polyvinylalcohol.

In some embodiments of the composition, the one or more latexes comprise a polyurethane latex.

In some embodiments of the composition, the humectant composition comprises one or more of dipropylene glycol, diethylene glycol, triethylene glycol, and glycerine.

In some embodiments of the composition, the humectant composition comprises glycerine.

In some embodiments of the composition, the surfactant composition comprises an anionic or a nonionic surfactant.

In some embodiments of the composition, the biocide composition comprises an antimicrobial.

In some embodiments of the composition, the buffer solution comprises triethanol amine.

In some embodiments of the composition, the solvent comprises water.

In some embodiments, a printed fabric having a dye sublimation ink-printed image is provided, the printed fabric comprising: a fabric comprising natural fibers; and a dye sublimation ink layer comprising: 7 to 60 wt. % one or more latexes; and a pigment.

In some embodiments of the printed fabric, the dye sublimation ink layer is formed from a liquid dye sublimation ink composition comprises: 1 to 25 wt. % humectant composition; 0.01 to 3 wt. % surfactant composition; 0.01 to 3 wt. % biocide composition; 0.1 to 3 wt. % buffer composition; and 30 to 50 wt. % solvent.

In some embodiments of the printed fabric, the fabric comprises natural fibers.

In some embodiments of the printed fabric, the fabric comprises one or more of wool, cotton, silk, linen, leather, hemp, or bamboo.

In some embodiments of the printed fabric, the fabric comprises synthetic fibers.

In some embodiments of the printed fabric, the fabric comprises polyester.

In some embodiments of the printed fabric, the fabric comprises a pretreated fabric.

In some embodiments of the printed fabric, the fabric comprises 8 to 15 grams of a pretreatment composition per square inch of natural fiber fabric, wherein the pretreatment composition comprises: 18 to 40 wt. % one or more latex polymers; 0.5 to 5 wt. % coalescing agent composition; 0.1 to 3 wt. % surfactant composition; 0.5 to 5 wt. % ultraviolet (UV) stabilizer composition; 0.5 to 5 wt. % antioxidant composition; and 40 to 75 wt. % solvent.

In some embodiments of the printed fabric, the one or more latexes comprise one or more of a polyester, an acrylic, an aramid, a chlorinated polymer, an elastane, an elastodiene, a fluorinated polymer, a polyurethane, a polyvinyl chloride, a polyolefin, a polystyrene, an acrylonitrile butadiene styrene, a polyacetate, a polyamide, a polyethylene, a polyimide, a polyether, a polycarbonate, or a polyvinylalcohol.

In some embodiments of the printed fabric, the one or more latexes comprise a polyurethane latex.

In some embodiments of the printed fabric, the humectant composition comprises one or more of dipropylene glycol, diethylene glycol, triethylene glycol, and glycerine.

In some embodiments of the printed fabric, the humectant composition comprises glycerine.

In some embodiments of the printed fabric, the surfactant composition comprises an anionic or a nonionic surfactant.

In some embodiments of the printed fabric, the biocide composition comprises an antimicrobial.

In some embodiments of the printed fabric, the buffer solution comprises triethanol amine.

In some embodiments of the printed fabric, the solvent comprises water.

In some embodiments of the printed fabric, the composition has a charge density of 0.2-0.5 meq/g.

In some embodiments of the printed fabric, the composition has a particle size of 15-20 nm as measured by ASTM E2490.

In some embodiments of the printed fabric, the composition has a polydispersity index of 0.1-0.5 as measured by ASTM E2490.

In some embodiments of the printed fabric, the composition a zeta potential of −40 to −70 mV as measured by ASTM E2865.

In some embodiments, an article comprising an image printed on a fabric with a dye sublimation ink composition is provided, the dye sublimation ink composition comprising: 5 to 40 wt. % one or more latexes; and a pigment.

In some embodiments of the article, the printed image has a color density of less than 100%.

In some embodiments of the article, the printed image has a color density of 0.8 to 1.4.

In some embodiments of the article, the fabric comprises one or more of wool, cotton, silk, linen, leather, hemp, or bamboo.

In some embodiments of the article, the fabric comprises synthetic fibers.

In some embodiments of the article, the fabric comprises a pretreated fabric.

In some embodiments of the article, the fabric comprises 8 to 15 grams of a pretreatment composition per square inch of natural fiber fabric, wherein the pretreatment composition comprises: 18 to 40 wt. % one or more latex polymers; 0.5 to 5 wt. % coalescing agent composition; 0.01 to 3 wt. % surfactant composition; 0.5 to 5 wt. % ultraviolet (UV) stabilizer composition; 0.5 to 5 wt. % antioxidant composition; and 40 to 75 wt. % solvent.

In some embodiments of the article, the one or more latexes of the dye sublimation ink composition comprises one or more of a polyester, an acrylic, an aramid, a chlorinated polymer, an elastane, an elastodiene, a fluorinated polymer, a polyurethane, a polyvinyl chloride, a polyolefin, a polystyrene, an acrylonitrile butadiene styrene, a polyacetate, a polyamide, a polyethylene, a polyimide, a polyether, a polycarbonate, or a polyvinylalcohol.

In some embodiments of the article, the one or more latexes of the dye sublimation ink composition comprises a polyurethane latex.

In some embodiments of the article, the humectant composition comprises one or more of dipropylene glycol, diethylene glycol, triethylene glycol, and glycerine.

In some embodiments of the article, the humectant composition comprises glycerine.

In some embodiments of the article, the surfactant composition comprises an anionic or a nonionic surfactant.

In some embodiments of the article, the biocide composition comprises an antimicrobial.

In some embodiments of the article, the buffer solution comprises triethanol amine.

In some embodiments of the article, the solvent comprises water.

In some embodiments of the article, the composition has a charge density of 0.2-0.5 meq/g.

In some embodiments of the article, the composition has a particle size of 15-20 nm as measured by ASTM E2490.

In some embodiments of the article, the composition has a polydispersity index of 0.1-0.5 as measured by ASTM E2490.

In some embodiments of the article, the composition a zeta potential of −40 to −70 mV as measured by ASTM E2865.

DETAILED DESCRIPTION OF THE INVENTION

Provided are dye sublimation ink compositions for printing onto fabrics (natural and synthetic fabrics). In particular, the dye sublimation ink compositions provided herein can adequately adhere to the fibers of natural (or synthetic) fabric. Generally speaking, dye sublimation inks are only compatible for printing on synthetic materials due to the absorption mechanism of the dye sublimation inks that favors the hydrophobicity of synthetic materials. Natural materials, such as natural fabrics (e.g., cotton, wool, silk) are hydrophilic and are not conducive to printing with dye sublimation inks.

However, dye sublimation inks provided herein comprise a latex that allows the dye sublimation ink to adhere to the fibers of a natural fabric instead of completely penetrating the fabric. This allows for the dye sublimation ink compositions provided herein to achieve printed images having less than 100% color density on natural fabrics. Dye sublimation inks, therefore, can be used to print on both natural fabrics and synthetic fabrics using either a direct printing process or a heat transfer printing process. The presence of the latex in the dye sublimation ink compositions greatly improves the colorfastness to laundering of the printed image. This means that the dye sublimation ink compositions provided herein are able to sufficiently adhere to the fibers of a printed fabric and resist readily penetrating through the fabric.

Provided below is a description of dye sublimation inks provided herein. In particular, discussed below are: (1) dye sublimation ink compositions; (2) methods of preparing dye sublimation ink compositions; and (3) methods of printing onto pretreated fabrics using dye sublimation ink compositions provided herein.

Dye Sublimation Ink Compositions

Dye sublimation ink compositions according to embodiments provided herein may include a latex, a humectant, a surfactant, an antioxidant, an ultraviolet absorber, a pigment composition, a coalescing agent, a crosslinking agent, and water. Dye sublimation inks that comprise these components can adequately adhere to the fibers of a hydrophilic natural fabric. As described above, the pretreatment compositions provided herein may be used with natural fiber fabric, synthetic fabric, or a fabric comprising a combination of natural and synthetic fibers. Note that the weight-percents provided with respect to each of these components refer to dye sublimation ink compositions prior to printing, unless stated otherwise.

Dye sublimation ink compositions described herein comprise a latex. A latex allows the dye sublimation ink to adequately adhere to the fibers of a natural fabric and not completely penetrate the fabric, as is the case with conventional dye sublimation inks. Suitable latexes may include, but are not limited to, a polyester, an acrylic, an aramid, a chlorinated polymer, an elastane, an elastodiene, a fluorinated polymer, a polyurethane, a styrene acrylic, a polyvinyl chloride, a polyolefin, a polystyrene, an acrylonitrile butadiene styrene, a polyacetate, a polyurethane acrylic, a polyamide, a polyethylene, a polyimide, a polyether, a polycarbonate, a polyvinylalcohol, and/or any other suitable dispersed or emulsified natural or synthetic polymers. The latex(es) may be provided in an aqueous or a solvent-based environment, Additionally, the latex(es) may be either soluble in the ink vehicle or dispersed as particulates.

In some embodiments, the latex may be a polyurethane latex. A polyurethane latex can provide a film (i.e., dye receptor) that accepts the diffusion of the sublimating dye. This film/dye receptor can increase the color density and the colorfastness to laundering. It also allows the dye sublimation ink to adhere to natural fibers. In some embodiments, the latex may comprise a polyurethane latex that comprises a polyester or polyether sulfone backbone. A polyurethane latex in dispersed form can be formed using any number of diols, diisocyanates, ionic or nonionic emulsifiers. In some embodiments, the polyurethane latex may be formed using a step-growth (condensation) synthesis. In some embodiments, a polyurethane latex may have a melting point less than 260° C. and/or a Vicat softening point less than 370° F.

In some embodiments, a dye sublimation ink composition may comprise 1-50 wt. %, 5-40 wt. %, 5-35 wt. %, or 10-30 wt. % latex. In some embodiments, a dye sublimation ink composition may comprise less than 50 wt. %, less than 45 wt. %, less than 40 wt. %, less than 35 wt. %, less than 30 wt. %, less than 25 wt. %, less than 20 wt. %, less than 15 wt. %, less than 10 wt. %, or less than 5 wt. % latex. In some embodiments, a dye sublimation ink composition may include more than 1 wt. %, more than 5 wt. %, more than 10 wt. %, more than 15 wt. %, more than 20 wt. %, more than 25 wt. %, more than 30 wt. %, more than 35 wt. %, more than 40 wt. %, or more than 45 wt. % latex. Suitable commercially-available latexes may include Essential R4289 (Essential™ Polymers), Essential 2635 (Essential™ Polymers), and Impranil® DLH (Covestro).

In some embodiments, a dye sublimation ink composition according to embodiments provided herein may comprise one or more humectants. Humectants can help the dye sublimation ink preserve moisture to prevent premature drying. Humectants may also help control dot gain (causing printed images to appear darker than intended). Suitable humectants include glycols, glycol ethers, alcohols, ketones, esters, and lactones. More specifically, suitable humectants can include dipropylene glycol, diethylene glycol, triethylene glycol, and glycerine. In some embodiments, dye sublimation ink compositions may include 1-40 wt. %, 1-25 wt. %, 5-30 wt. %, or 10-20 wt. % humectant. In some embodiments, dye sublimation ink compositions may include less than 40 wt. %, less than 35 wt. %, less than 30 wt. %, less than 25 wt. %, less than 20 wt. %, less than 15 wt. %, less than 10 wt. %, or less than 5 wt. % humectant. In some embodiments, dye sublimation inks may include more than 1 wt. %, more than 5 wt. %, more than 10 wt. %, more than 15 wt. %, more than 20 wt. %, more than 25 wt. %, more than 30 wt. %, or more than 35 wt. % humectant.

Dye sublimation inks provided herein may include a surfactant composition. Surfactants in dye sublimation ink compositions provided herein can help increase the wetting of the ink on various fabrics (e.g., synthetic, natural). A surfactant can also improve the hand, or feel, of the fabric by reducing the thickness of the dye sublimation ink on the fabric. Suitable surfactants include, but are not limited to, anionic, cationic, nonionic, and/or amphoteric surfactants. Specific examples of suitable surfactants include BYK®-348 (BYK), BYK DYNWET 800 N (BYK), and Surfynol® 504/336 (Evonik). Too much surfactant composition in a dye sublimation ink composition may not provide a sufficient ink layer on the fabric. Too little surfactant, and the dye sublimation ink composition may not sufficiently spread to create a thin layer on the fabric and/or may not provide desirable hand of the fabric. In some embodiments, a dye sublimation ink 0.01-10 wt. %, 0.1-5 wt. %, or 0.01-3 wt. % surfactant composition. In some embodiments, a dye sublimation ink composition may include less than 10 wt. %, less than 8 wt. %, less than 5 wt. %, less than 4 wt. %, less than 3 wt. %, less than 2 wt. %, less than 1 wt. %, or less than 0.5 wt. %, less than 0.1 wt. %, or less than 0.05 wt. % surfactant composition. In some embodiments, a dye sublimation ink composition may include more than 0.01 wt. %, more than 0.05 wt. %, more than 0.1 wt. %, more than 1 wt. %, more than 3 wt. %, more than 5 wt. %, or more than 8 wt. % surfactant composition.

Dye sublimation ink compositions according to embodiments described herein may also include an ultraviolet (UV) absorber composition. A UV absorber composition may help increase the weatherfastness of the printed ink on the fabric. Suitable UV absorber compositions include, but are not limited to, sulfonated benzophenones, benzotriazoles, salicylates, cinnamates, triazoles, and triazines. Specific examples of commercially-available UV absorbers that may be suitable for dye sublimation ink compositions provided herein may include Tinuvin® 400 (BASF) or Chiguard® 5400 (Chitec). Both Tinuvin® 400 (BASF) and Chiguard® 5400 (Chitec) are hydroxyphenyl triazines. Dye sublimation ink compositions including too little UV absorber composition may not provide enough protection against weather damage. Dye sublimation ink compositions including too much UV absorber composition may compromise the beneficial effects of other components in the dye sublimation ink composition. In some embodiments, a dye sublimation ink composition may include 0.1-10 wt. %, 0.3-8 wt. %, or 0.5-5 wt. % UV absorber composition. In some embodiments, a dye sublimation ink composition may include less than 10 wt. %, less than 8 wt. %, less than 5 wt. %, less than 3 wt. %, or less than 1 wt. % UV absorber composition. In some embodiments, a dye sublimation ink composition may include more than 0.1 wt. %, more than 0.3 wt. %, more than 0.5 wt. %, more than 1 wt. %, more than 3 wt. %, more than 5 wt. %, or more than 8 wt. % UV absorber composition.

Dye sublimation ink compositions provided herein may also include an antioxidant composition. Like UV absorbers, described above, antioxidants may help increase the weatherfastness of the printed ink on the fabric. Suitable antioxidants include, but are not limited to, hydroquinones, alkoxyphenols, dialkoxyphenols, phenols, anilines, amines, indanes, chromanes, alkoxyanilines, and heterocyclic compounds. Specific examples of antioxidants that may be suitable for dye sublimation ink compositions provided herein may include Chiguard® 101WB (Chitec) or Tinuvin® 123 DW (BASF). In some embodiments, a dye sublimation ink composition may include from 0.1 to 10 wt. %, from 0.3 to 8 wt. %, or from 0.5 to 5 wt. % antioxidant. In some embodiments, a dye sublimation ink composition may include less than 10 wt. %, less than 8 wt. %, less than 5 wt. %, less than 3 wt. %, or less than 1 wt. % antioxidant. In some embodiments, a dye sublimation ink composition may include more than 0.1 wt. %, more than 0.3 wt. %, more than 0.5 wt. %, more than 0.8 wt. %, more than 1 wt. %, more than 3 wt. %, more than 5 wt. %, or more than 8 wt. % antioxidant.

In some embodiments, a dye sublimation ink composition according to embodiments provided herein may include a biocide. Biocides can include any chemical substance or microorganism intended to destroy, deter, render harmless, or exert a controlling effect on any harmful organism. Biocides can include algaecides, fungicides, bactericides, antimicrobials, and yeasticides. Dye sublimation ink compositions comprising a biocide may be able to resist any destruction or contamination due to bacteria, fungi, algae, and/or yeast. Suitable biocides include sodium pyrithione and benzisothiazolinone. In some embodiments, dye sublimation ink compositions may include 0.01-10 wt. %, 0.3-8 wt. %, 0.5-5 wt. %, or 0.01-3 wt. % biocide. In some embodiments, a dye sublimation ink composition may include less than 10 wt. %, less than 8 wt. %, less than 5 wt. %, less than 3 wt. %, less than 1 wt. %, or less than 0.1 wt. % biocide. In some embodiments, a dye sublimation ink composition may include more than 0.01 wt. 5, more than 0.1 wt. %, more than 0.3 wt. %, more than 0.5 wt. %, more than 1 wt. %, more than 3 wt. %, more than 5 wt. %, or more than 8 wt. % biocide.

In some embodiments, a dye sublimation ink composition may comprise an acidic or basic composition as a buffer solution. For example, the acidic or basic composition may include an organic Lewis acid or an organic Lewis base. Suitable acidic/basic compositions can include 2-amino-2-methyl-1-propanol (AMP) and triethanol amine. In some embodiments, dye sublimation ink compositions may include 0.01-10 wt. %, 0.05-8 wt. %, or 0.1-3 wt. % acidic or basic composition. In some embodiments, a dye sublimation ink composition may include less than 10 wt. %, less than 8 wt. %, less than 5 wt. %, less than 3 wt. %, less than 1 wt. %, or less than 0.1 wt. % acidic or basic composition. In some embodiments, a dye sublimation ink composition may include more than 0.01 wt. %, more than 0.1 wt. %, more than 0.3 wt. %, more than 0.5 wt. %, more than 1 wt. %, more than 3 wt. %, more than 5 wt. %, or more than 8 wt. % acidic or basic composition.

Dye sublimation ink compositions provided herein can comprise a pigment composition. A pigment composition may include one or more colorants. The pigment composition may further improve the washability of the dye sublimation ink composition. In some embodiments, a pigment composition may include one or more of a dye sublimation dispersion and a water-based pigment dispersion. In some embodiments, the dye sublimation dispersion may be a Sun Jetsperse® DS dispersion. In some embodiments, the water-based pigment dispersion may be a Kodak A1 pigment dispersion. In some embodiments, a dye sublimation ink composition may comprise 1-90 wt. %, 10-80 wt. %, or 20-70 wt. % pigment composition. In some embodiments, a dye sublimation ink composition may include less than 90 wt. %, less than 80 wt. %, less than 70 wt. %, less than 60 wt. %, less than 50 wt. %, less than 40 wt. %, less than 30 wt. %, less than 20 wt. %, or less than 10 wt. % pigment composition. In some embodiments, a dye sublimation ink composition may include more than 1 wt. %, more than 10 wt. %, more than 20 wt. %, more than 30 wt. %, more than 40 wt. %, more than 50 wt. %, more than 60 wt. %, more than 70 wt. %, or more than 80 wt. % pigment composition.

In some embodiments, the pigment composition may include one or more dye sublimation dispersions. In some embodiments, the pigment composition may include one or more pigment dispersions. In some embodiments, the pigment composition may include one or more dye sublimation dispersions and one or more pigment dispersions. In some embodiments, the pigment composition may comprise 1-50 wt. %, 15-45 wt. %, or 25-35 wt. % dye sublimation dispersion. In some embodiments, the pigment composition may include less than 50 wt. %, less than 45 wt. %, less than 40 wt. %, less than 35 wt. %, less than 30 wt. %, or less than 20 wt. % dye sublimation dispersion. In some embodiments, the pigment composition may include more than 1 wt. %, more than 10 wt. %, more than 20 wt. %, or more than 30 wt. % dye sublimation dispersion. In some embodiments, the pigment composition may comprise 1-30 wt. % pigment dispersion. In some embodiments, the pigment composition may include less than 30 wt. %, less than 20 wt. %, or less than 10 wt. % pigment dispersion. In some embodiments, the pigment composition may include more than 1 wt. %, more than 5 wt. %, or more than 10 wt. % pigment dispersion.

In some embodiments, dye sublimation ink compositions described herein include a crosslinking agent. The crosslinking agent may cross-link polyurethane and form a film on the surface of the fabric that prevents the pigment composition from coming off the fabric. In some embodiments, the crosslinking agent may be, for example, Imprafix 2794 XP or Imprafix 2754. In some embodiments, the dye sublimation ink composition may comprise 0.05 wt. %-30 wt. % cross-linking agent. In some embodiments, dye sublimation ink composition may include less than 30 wt. %, less than 20 wt. %, or less than 10 wt. % cross-linking agent. In some embodiments, the dye sublimation ink composition may include more than 0.05 wt. %, more than 1 wt. %, more than 5 wt. %, or more than 10 wt. % cross-linking agent.

In some embodiments, dye sublimation ink compositions described herein include a solvent. Suitable solvents include ethanol and water. For example, a dye sublimation ink composition may include 1-90 wt. %, 10-80 wt. %, 20-70 wt. %, or 30-50 wt. % solvent. In some embodiments, a dye sublimation ink composition may include less than 90 wt. %, less than 80 wt. %, less than 70 wt. %, less than 60 wt. %, less than 50 wt. %, less than 40 wt. %, less than 30 wt. %, less than 20 wt. %, or less than 10 wt. % solvent. In some embodiments, a dye sublimation ink composition may include more than 1 wt. %, more than 10 wt. %, more than 20 wt. %, more than 30 wt. %, more than 40 wt. %, more than 50 wt. %, more than 60 wt. %, more than 70 wt. %, or more than 80 wt. % solvent.

Dye sublimation ink compositions provided herein can achieve printed images having various color densities on natural fabrics. Conventional dye sublimation processes and dye sublimation inks can only achieve printed images on natural fabrics having 100% color density. Thus, the dye sublimation ink compositions provided herein can allow for more variety in colors, shades, and tints, in the printed images on natural fabrics than that of conventional dye sublimation inks used in dye sublimation ink processes.

In some embodiments, the color density of a printed image on natural fabric using dye sublimation ink compositions provided herein may be 0.8 to 1.5. In some embodiments, a printed image may have a color density of less than 1.5, less than 1.4, less than 1.3, less than 1.2, less than 1.1, less than 1.0, or less than 0.9. In some embodiments, the color density of a printed image on natural fabric using the dye sublimation ink compositions provided herein may be more than 0.8, more than 0.9, more than 1.0, more than 1.1, more than 1.2, more than 1.3, or more than 1.4.

Preparing Dye Sublimation Ink Compositions

Provided below are methods of preparing dye sublimation ink compositions.

Each of the components are measured/weighed in a suitable container (e.g. neoprene beaker) using a microbalance. The solvent is added first, and then the latex with the lowest pH. If a coalescing agent is added, it should be diluted with the solvent and added slowly after the addition of the latex. The components can be mixed together using a suitable mixing device, such as a magnetic stirrer or a mechanical stirrer. Once the solvent and the latex is mixed, the pH of the mixture is adjusted to be above neutral using a basic solution. The rest of the ingredients can then be added in the following order, humectants, surfactant, biocide, any other additives and colorant.

Printing on Pretreated Fabrics

In some embodiments, dye sublimation ink compositions provided herein may be printed (e.g., directly-printed or transfer-printed) onto pretreated fabric. Pretreated fabric may include a thin layer of a pretreatment composition on the fabric. In some embodiments, the pretreated fabric can help improve crock, hand, colorfastness to laundering, adhesion, color density, etc. for dye sublimation ink-printed images. Pretreatment compositions may be used to prepare various articles or products for printing. For example, a pretreatment composition may be applied to an article of clothing (e.g., T-shirt, sweater, dress), bedding, window treatment (e.g., curtains), and other types of fabrics that a consumer may wish to print onto. Pretreatment compositions, pretreated fabrics, methods for preparing pretreatment compositions, and methods for pretreating natural fiber fabrics are described in more detail in U.S. Application No. 62/884,013 and Ser. No. 16/988,445, titled "Pretreating Natural Fiber fabrics for Dye Sublimation Ink Printing," the entirety of which is incorporated herein by reference.

In some embodiments, 0.001 to 1 grams of liquid pretreatment composition per square inch (g/in2) of fabric surface area is applied. In some embodiments, 0.01 to 0.8 or 0.05 to 0.5 g/in2 liquid pretreatment composition is applied. In some embodiments, less than 1 g/in2, less than 0.8 g/in2, less than 0.5 $g/in^2$, less than 0.3 $g/in^2$, less than 0.2 $g/in^2$, less than 0.1 $g/in^2$, less than 0.05 $g/in^2$, or less than 0.01 $g/in^2$ pretreatment composition is applied. In some embodiments, more than 0.001 $g/in^2$, more than 0.01 $g/in^2$, more than 0.05 $g/in^2$, more than 0.1 $g/in^2$, more than 0.2 $g/in^2$, more than 0.3 $g/in^2$, more than 0.5 $g/in^2$, or more than 0.8 $g/in^2$ pretreatment composition is applied.

In some embodiments, 0.001 to 0.08 grams of dry pretreatment composition per square inch ($g/in^2$) of fabric surface area is applied. In some embodiments, 0.01 to 0.03 $g/in^2$ dry pretreatment composition is applied. In some embodiments, less than 0.08 $g/in^2$, 0.05 $g/in^2$, less than 0.04 $g/in^2$, less than 0.03 $g/in^2$, less than 0.02 $g/in^2$, or less than 0.01 $g/in^2$ is applied. In some embodiments, more than 0.001 g/in², more than 0.01 g/in², more than 0.02 g/in², more than 0.03 g/in², more than 0.04 g/in², or more than 0.05 g/in² is applied.

Dye sublimation ink compositions provided herein may be printed onto pretreated fabrics. For example, dye sublimation ink compositions may be either transfer-printed or directly-printed onto the pretreated fabric. In some embodiments, using the dye sublimation ink compositions comprising latex provided herein may be printed onto pretreated fabric for improved hand, crock, colorfastness, etc. that the pretreated fabric or the dye sublimation ink comprising latex cannot achieve alone.

Testing Methods

Various chemical and physical properties may be used to characterize the sufficiency of a pretreated natural fiber fabric. In some embodiments, the pretreated natural fiber fabric may be printed with an ink or dye (e.g., dye sublimation ink) prior to characterization. Discussed below are properties used for characterizing fabrics and the testing methods used for each.

Colorfastness to Laundering: A printed fabric's colorfastness determines its ability to retain its depth and shade throughout the life of the product, and in particular, throughout laundering of the product. Ideally, a printed image on a fabric can withstand the lifetime of the product without significantly compromising the quality (e.g., depth, shade) of the printed image. The colorfastness of a printed natural fiber fabric may be tested using Method 1 and/or Method 2, described below.

Method 1: Colorfastness to laundering may be tested by placing a printed fabric sample measuring 8.5 inches by 5.5 inches in a consumer washing machine and washed for 15 minutes with room temperature water and 0.5 g of detergent (such as Tide® detergent or Woolite® Delicate detergent) per 0.5 L of water. A standard wash cycle was used (cotton/medium) with a standard spin cycle. (The sample was washed with 9-14 other printed fabric samples). The printed fabric sample was rinsed with 0.5 L water per sample for six minutes. The sample(s) was then spin-dried for five minutes and then further dried until dry (for example, by placing in an oven at 60° C. until dry or hang drying at room temperature until dry).

The washed and dried samples were analyzed using a Gretag spectrophotometer for optical density, L, a*, and b* values. The inks were printed onto Wing Wing Hybrid transfer paper using, for example, a 2 Krod at speed 10 on a K Control Coater (RKPrint) or a Mutoh 901X printer. The image was transferred, for example, at 392° F. for 40 seconds or 385° F. for 35 seconds.

Method 2: Colorfastness to laundering may be tested by placing a printed fabric sample measuring 8.5 inches by 5.5 inches was placed in a consumer washing machine and washed for 15 minutes with room temperature water and 0.5 g of Woolite® Delicate detergent per 0.5 L of water. A standard wash cycle was used (cotton/medium) with a standard spin cycle. (The sample was washed with 9-14 other printed fabric samples). The printed fabric sample was rinsed with 0.5 L water per sample for six minutes. The sample(s) was then spin-dried for five minutes and then further dried until dry (for example, by placing in an oven at 60° C. until dry or hang drying at room temperature until dry.

The washed and dried samples were analyzed using a Gretag spectrophotometer for optical density, L, a*, and b* values. The image was printed directly to the substrate using a standard DOD inkjet printer using standard dye sublimation inks. The image was transferred, for example, at 370° F. for 60 seconds or 385° F. for 35 seconds.

Particle Size and Polydispersity Index: The particle size and polydispersity of a pretreatment composition was measured using ASTM E2490 (referring to the American Society for Testing and Materials standards) Standard Guide for Measurement of Particle Size Distribution of Nanomaterials in Suspension by Photon Correlation Spectroscopy (PCS).

Zeta Potential: Zeta potential is the electrokinetic potential of a colloidal dispersion. The zeta potential of a latex dispersion (e.g., polyester latex, acrylic latex) and/or pretreatment composition may be measured using ASTM E2865 Standard Guide for Measurement of Electrophoretic Mobility and Zeta Potential of Nanosized Biological Materials.

Fabric Hand: The hand of a fabric measures the "feel" of the fabric against skin. The hand of a fabric can change with the printing of an image on the fabric. However, it is generally not desirable for the printed image to significantly impact the hand of the fabric, particularly for wearable products. The hand of a fabric was measured using standard AATCC EP 5 (referring to the American Association of Fabric Chemists and Colorists standards) Guidelines to the Subjective Evaluation of Fabric Hand. This standard uses a scale of 1-5 to characterize the hand of the fabric, where 1 is worst and 5 is best.

Crock Testing: Crock refers to the transfer of ink/dye from the fabric to another. For example, if the ink/dye of a printed image does not sufficiently adhere to the fabric, it may transfer to another substrate that it contacts. Ideally, the ink/dye of a printed image sufficiently adheres to the fabric to minimize any tendency for the ink/dye to crock. Crock may be tested using standard AATCC 8 Colorfastness to Crock: Crockmeter Method and a scale of 1 to 5, 5 being the best, and 1 being the worst. AATCC 8 includes testing methods for wet crock and dry crock as well.

Weatherfastness: Weatherfastness may refer to the ability of a printed image on a fabric to withstand extended periods of weathering. For example, weatherfastness may refer to a printed image's ability to resist fading when exposed to ultraviolet light. A high quality printed image will have a higher tolerance to weather and will be able to resist fading due to ultraviolet light exposure. Weatherfastness may be tested using ASTM G154 Standard Practice for Operating Fluorescent Light Apparatus for UV Exposure of Nonmetallic Materials.

Color Measurement: The color uniformity of a printed image may be tested. In many cases, a higher quality printed image will have a higher uniformity. The color may be tested using ASTM D2244-16 Standard Practice for Calculation of Color Tolerances and Color Differences from Instrumentally Measured Color Coordinates.

EXAMPLES

Provided below are several examples that highlight different characteristics of specific components o dye sublimation ink compositions and fabrics printed with dye sublimation ink compositions provided herein.

Testing Different Latexes for Dye Sublimation Ink Composition

Table 1 and 2 shows dye sublimation ink compositions with different types of latexes. Specifically, dye sublimation ink compositions were prepared and tested using four different latex polymers: Essential 2635 (30%) (Essential Polymers), Eastek 1200 (30%) (Eastman), Impranil DLH (50%) (Covestro), and Acrygen 61192 (50%) (Omnova Solutions).

Table 1, below, shows the properties of each latex used in this trial.

TABLE 1

Properties of each of latex tested.

| | Essential 2635 | Eastek 1200 | Impranil DLH | Acrygen 61192 | Testing Method |
|---|---|---|---|---|---|
| Tg (° C.) | | 63 | | −12 | |
| Viscosity (cps) | 120 | 100 | | 30 | |
| pH | 7.8 | 6.6 | 6.5 | 5 | |
| Melting Point (deg C.) | | | 170 | 6 | |
| MFFT (deg C.) | | 27 | | | |
| Solids % | 31.5 | 30 | 40 | 43 | |
| Density (pound/gallon) | 1.04 | | 1.1 | | |
| Elongation (%) | | | 1000 | | |
| Tensile Strength (MPa) | | | 50 | | |
| Acid Value | | | | | |
| Ionic Character Chemistry | Anionic Polyurethane | Anionic Sulfo-Polyester | Anionic Aliphatic Polyethersulfone Polyurethane | Non-Ionic Self Cross-linking Acrylic | |
| Charge Density (meq/g) | | 0.33 | | | |
| Particle Size (nm) | | 18.28 | | | ASTM E2490 |
| Polydispersity Index | | 0.227 | | | ASTM E2490 |
| Zeta Potential (mV) | | −56.72 | | | ASTM E2865 |

Table 2, below, provides the composition of seven different dye sublimation ink compositions (Samples 3-8), in addition to a control sample (Sample 1) for a first set of samples (Samples 1-8). In the samples of Table 2: Glycerine and Diethylene Glycol (DEG) are humectants, Proxel GXL is a biocide, Dynwet 800N is a surfactant, and Triethanolamine is a buffer.

Tables 3A-3E, provided below, show the testing results of color density and colorfastness for each sample (i.e., the same samples provided in Table 2), according to some embodiments. Color was tested using ASTM D2244-16, colorfastness was tested using AATCC 61, Crock Wet was tested using AATCC 8, Crock Dry was tested using AATCC 8, and Fabric Hand was tested using AATCC 5. Tables 3A-3C show exemplary test results for printing dye sublimation inks onto natural fabrics (such as a wool, cotton, silk, linen, leather, hemp, or bamboo). Tables 3D-3E show exemplary test results for printing dye sublimation inks onto synthetic or man-made fabrics (such as polyester or nylon). The initial color densities and colorfastness test results of Tables 3B-3E show that the samples printed with dye sublimation ink compositions provided herein are transferrable to natural fibers (as shown in Tables 3B and 3C) and synthetic fibers (as shown in Tables 3D and 3E).

Table 3A shows the results of transfer-printed dye sublimation inks onto cotton textile without pre-treatment of cotton textile and Table 3B shows the results of direct-printed dye sublimation inks onto cotton textile without pre-treatment of cotton textile. Table 3C shows the results of direct-printed dye sublimation inks onto pre-treated cotton textile, Table 3D shows the results of transfer-printed dye sublimation inks onto polyester textile, and Table 3E shows the results of direct-printed dye sublimation inks onto polyester textile. In Tables 3A-3E, a color measurement is the measurement of the color density, or amount of dye transfer. A smaller number (L value) indicates a darker shade and more dye transfer, whereas a larger L value indicates a lighter shade and less dye transfer. The colorfastness test results of Tables 3A-3E show that the samples printed with dye sublimation ink compositions provided herein exhibited a smaller color change and thus, better colorfastness results. The results are reported as delta E (ΔE) values, which is the color difference between the original color densities measured before laundering and after five washes. For Crock Wet/Dry testing, a scale of 1 to 5 is used to characterize the fabric, where 1 is the worst and 5 is the best. For Fabric Hand testing, a scale of 1-5 is also used to characterize the hand of the fabric, where 1 is worst and 5 is best.

TABLE 2

Composition of each sample.

| Component | Sample 1 | Sample 2 | Sample 3 | Sample 4 | Sample 5 | Sample 6 | Sample 7 | Sample 8 |
|---|---|---|---|---|---|---|---|---|
| DI Water | 43.3 | 42.2 | 42.3 | 39.3 | 39.3 | 34.3 | 40.8 | 42.3 |
| Glycerine | 14 | 14 | 14 | 14 | 14 | 14 | 14 | 14 |
| Diethylene Glycol | 19 | 15.5 | 15 | 13 | 13 | 8 | 14 | 14 |
| Proxel GXL | 0.15 | 0.15 | 0.15 | 0.15 | 0.15 | 0.15 | 0.15 | 0.15 |
| Dynwet 800N | 0.05 | 0.05 | 0.05 | 0.05 | 0.05 | 0.05 | 0.05 | 0.05 |
| Sun DSYL54PDS172 (16%) | 23 | 27.6 | 23 | 23 | 23 | 23 | 23 | 23 |
| Triethanolamine | 0.5 | 0.5 | 0.5 | 0.5 | 0.5 | 0.5 | 0.5 | 0.5 |
| Essential 2635 (30%) | | 5.00 | 10.00 | | | | | |
| Eastek 1200 (30%) | | | | 10.00 | 20.00 | | | |
| Impranil DLH (40%) | | | | | | | 7.50 | |
| Acrygen 61192 (50%) | | | | | | | | 6.00 |

TABLE 3A

Color and colorfastness results for each sample transfer-printed onto cotton textile without pre-treatment of cotton textile.

|  |  | Sample 1 | Sample 2 | Sample 3 | Sample 4 | Sample 5 | Sample 6 | Sample 7 | Sample 8 |
|---|---|---|---|---|---|---|---|---|---|
| Color Measurement After Transfer 385 C. 40 s (L value) | Initial | 0.68 | 0.47 | 0.44 | 0.49 | 0.412 | 0.46 | 0.43 | 0.47 |
| | Wash 1 | 0.30 | 0.25 | 0.27 | 0.29 | 0.224 | 0.27 | 0.24 | 0.28 |
| | Wash 2 | 0.19 | 0.14 | 0.15 | 0.17 | 0.14 | 0.15 | 0.14 | 0.16 |
| | Wash 5 | 0.18 | 0.12 | 0.15 | 0.15 | 0.12 | 0.13 | 0.13 | 0.14 |
| Colorfastness Method 1 | ΔE Wash 1 | 31.7 | 20.4 | 16.8 | 19.1 | 19.1 | 18.9 | 19.3 | 18.7 |
| | ΔE Wash 3 | 41.6 | 31.1 | 28.6 | 31.5 | 28.1 | 30.2 | 29.4 | 29.9 |
| | ΔE Wash 5 | 41.7 | 32.4 | 28.3 | 32.1 | 29.4 | 31.6 | 30.0 | 30.4 |
| Crock Wet | | 2 | 4 | 1-2 | 1-2 | 2 | 1-2 | 3-4 | 1-2 |
| Crock Dry | | 2-3 | 3 | 1 | 1 | 1-2 | 1 | 4 | 1 |
| Fabric Hand | | 5 | 5 | 5 | 5 | 5 | 5 | 5 | 5 |

TABLE 3B

Color and colorfastness results for each sample direct-printed onto cotton textile without pre-treatment of cotton textile.

|  |  | Sample 1 | Sample 2 | Sample 3 | Sample 4 | Sample 5 | Sample 6 | Sample 7 | Sample 8 |
|---|---|---|---|---|---|---|---|---|---|
| Color Measurement After Direct Printing and Heat Press 385 C. 40 s (L value) | Initial | 1.07 | 0.99 | 0.95 | 0.95 | 0.934 | 0.96 | 0.94 | 0.99 |
| | Wash 1 | 0.61 | 0.64 | 0.77 | 0.79 | 0.768 | 0.81 | 0.81 | 0.82 |
| | Wash 2 | 0.45 | 0.48 | 0.69 | 0.71 | 0.658 | 0.69 | 0.75 | 0.75 |
| | Wash 5 | 0.39 | 0.42 | 0.65 | 0.67 | 0.602 | 0.63 | 0.72 | 0.72 |
| Colorfastness Method 2 | ΔE Wash 1 | 32.0 | 23.7 | 10.4 | 9.4 | 10.1 | 9.8 | 7.7 | 9.2 |
| | ΔE Wash 3 | 43.0 | 35.0 | 15.7 | 14.2 | 17.6 | 17.3 | 11.2 | 13.3 |
| | ΔE Wash 5 | 48.4 | 39.3 | 18.3 | 16.9 | 21.6 | 21.4 | 12.7 | 15.0 |
| Crock Wet | | 3 | 2 | 3 | 3 | 3 | 3-4 | 3 | 3 |
| Crock Dry | | 4-5 | 2-4 | 2-3 | 3 | 4 | 4-5 | 3-4 | 3-4 |
| Fabric Hand | | 5 | 5 | 5 | 5 | 5 | 5 | 5 | 5 |

TABLE 3C

Color and colorfastness results for each sample direct-printed onto pre-treated cotton textile.

|  |  | Sample 1 | Sample 2 | Sample 3 | Sample 4 | Sample 5 | Sample 6 | Sample 7 | Sample 8 |
|---|---|---|---|---|---|---|---|---|---|
| Color Measurement After Direct Printing and Heat Press 385 C. 40 s (L value) | Initial | 1.26 | 1.25 | 1.24 | 1.25 | 1.226 | 1.25 | 1.23 | 1.24 |
| | Wash 1 | 1.05 | 1.09 | 1.06 | 1.06 | 1.05 | 1.07 | 1.04 | 1.08 |
| | Wash 2 | 0.98 | 0.98 | 0.966 | 0.99 | 0.95 | 1.00 | 0.96 | 0.97 |
| | Wash 5 | 0.94 | 0.94 | 0.93 | 0.94 | 0.914 | 0.95 | 0.92 | 0.93 |
| Colorfastness Method 2 | ΔE Wash 1 | 10.2 | 6.0 | 8.1 | 8 | 8.4 | 6.6 | 5.5 | 6.4 |
| | ΔE Wash 3 | 12.9 | 10.8 | 12.8 | 11.7 | 13.8 | 10.4 | 9 | 12.2 |
| | ΔE Wash 5 | 15.1 | 13.1 | 15.1 | 14 | 15.8 | 12.6 | 11.5 | 14.3 |
| Crock Wet | | 3-4 | 3-4 | 3-4 | 3-4 | 3 | 3-4 | 3 | 3-4 |
| Crock Dry | | 4-5 | 4-5 | 4-5 | 4-5 | 4 | 3-4 | 4-5 | 4-5 |
| Fabric Hand | | 3 | 3 | 3 | 3 | 3 | 3 | 3 | 3 |

TABLE 3D

Color and colorfastness results for each sample transfer-printed onto polyester textile.

| | | Sample 1 | Sample 2 | Sample 3 | Sample 4 | Sample 5 | Sample 6 | Sample 7 | Sample 8 |
|---|---|---|---|---|---|---|---|---|---|
| Color Measurement After Direct Printing and Heat Press 385 C. 40 s (L value) | Initial | 1.44 | 1.37 | 1.47 | 1.38 | 1.402 | 1.36 | 1.40 | 1.37 |
| | Wash 1 | 1.43 | 1.38 | 1.45 | 1.38 | 1.402 | 1.36 | 1.38 | 1.38 |
| | Wash 2 | 1.44 | 1.40 | 1.46 | 1.40 | 1.404 | 1.38 | 1.41 | 1.39 |
| | Wash 5 | 1.45 | 1.39 | 1.48 | 1.39 | 1.398 | 1.38 | 1.40 | 1.39 |
| Colorfastness Method 1 | ΔE Wash 1 | 0.2 | 0.2 | 0.5 | 0.0 | 0.6 | 0.2 | 0.3 | 0.3 |
| | ΔE Wash 3 | 0.3 | 0.7 | 0.2 | 0.4 | 0.3 | 0.4 | 0.2 | 0.5 |
| | ΔE Wash 5 | 0.4 | 0.5 | 0.9 | 0.5 | 0.4 | 0.6 | 0.5 | 0.2 |
| Crock Wet | | 5 | 5 | 5 | 5 | 5 | 5 | 5 | 5 |
| Crock Dry | | 5 | 5 | 5 | 5 | 5 | 5 | 5 | 5 |
| Fabric Hand | | 5 | 5 | 5 | 5 | 5 | 5 | 5 | 5 |

TABLE 3E

Color and colorfastness results for each sample direct-printed onto polyester textile.

| | | Sample 1 | Sample 2 | Sample 3 | Sample 4 | Sample 5 | Sample 6 | Sample 7 | Sample 8 |
|---|---|---|---|---|---|---|---|---|---|
| Color Measurement After Direct Printing and Heat Press 385 C. 40 s (L value) | Initial | 1.44 | 1.42 | 1.42 | 1.47 | 1.476 | 1.53 | 1.47 | 1.47 |
| | Wash 1 | 1.41 | 1.41 | 1.43 | 1.44 | 1.458 | 1.51 | 1.45 | 1.45 |
| | Wash 2 | 1.43 | 1.42 | 1.40 | 1.44 | 1.45 | 1.52 | 1.45 | 1.43 |
| | Wash 5 | 1.45 | 1.46 | 1.42 | 1.45 | 1.434 | 1.52 | 1.44 | 1.45 |
| Colorfastness Method 2 | ΔE Wash 1 | 1.1 | 0.3 | 0.2 | 0.8 | 0.7 | 0.6 | 0.6 | 0.7 |
| | ΔE Wash 3 | 0.7 | 0.4 | 0.7 | 1.1 | 1.2 | 0.8 | 0.9 | 1.5 |
| | ΔE Wash 5 | 1.3 | 1.2 | 1.3 | 1.6 | 2.4 | 1.5 | 1.8 | 1.7 |
| Crock Wet | | 5 | 5 | 5 | 5 | 5 | 5 | 5 | 5 |
| Crock Dry | | 5 | 5 | 5 | 5 | 5 | 5 | 5 | 5 |
| Fabric Hand | | 5 | 5 | 5 | 5 | 5 | 5 | 5 | 5 |

Tables 3A-3E show color measurements of a printed image. The color measurements of Table 3A indicate that transfer printing onto cotton do yield low initial color densities. The low initial color densities are due to the fact that the dye sublimation dispersions used in the formulations to not adhere to the natural fibers. Table 3B shows results associated with direct printing onto cotton with no pre-treatment. Comparison of Tables 3A and 3B suggests that directly-printed dye sublimation ink on cotton without pre-treatment can produce printed images having increased color than that of transfer-printed dye sublimation ink images on cotton without pre-treatment. Additionally, Table 3B shows Crock test values that are in line with what is acceptable in the ink industry and Fabric Hand values that indicate the fabric remained relatively soft. Furthermore, Table 3B shows that Sample 7 achieved the lowest delta E values compared to the other samples.

Table 3C shows results of each sample direct-printed dye sublimation inks onto cotton textile pre-treated with pre-treatment composition provided herein. In comparison to Tables 3A and 3B, Table 3C shows higher initial color density measurements, further reduction in delta E values, and improvement in Crock Wet and Crock Dry testing. The Fabric Hand testing results of Table 3C are lower than those of Tables 3A and 3B likely due to amount of polymer present. Overall, the comparison of Tables 3A-3C suggests that directly-printed dye sublimation ink on cotton pre-treated with pre-treatment composition provided herein can produce printed images having increased color than that of transfer-printed dye sublimation ink images on cotton and increased color than that of directly-printed dye sublimation ink images on cotton without pre-treatment.

Tables 3D and 3E show that the color densities and color fastness for polyester. The color densities and colorfastness test results of Tables 3D and 3E show that the samples printed with dye sublimation ink compositions provided herein may be transferred to natural fibers and synthetic fibers with industry acceptable color density values, delta E values, Crock testing values, and Fabric hand testing values. That is, the dye sublimation ink compositions provided herein are compatible with both natural fibers and synthetic fibers.

Table 4, below, provides the composition of four different dye sublimation ink compositions for a second set of samples (Samples 9-12). Samples 9-12 include different pigment compositions. Samples 10-12 include a pigment composition that include two pigments (Sun DSYL54PDS172 (16%) and Kodak A1 Yellow). Sun DSYL54PDS172 (16%) is a dye sublimation dispersion that sublimes when heated and then transfers into the fabric. Kodak A1 Yellow is a water-based pigment dispersion—it does not sublime when heated. Sample 9 includes a pigment composition that includes a single pigment (Sun DSYL54PDS172 (16%)). Sample 9 is a control sample for assessing ink performance of ink compositions comprising two pigments (Samples 10-12) versus a single pigment (Sample 9).

TABLE 4

Composition of each sample of the second sample set. Each sample includes a different pigment composition.

| Component | Sample 9 | Sample 10 | Sample 11 | Sample 12 |
|---|---|---|---|---|
| DI Water | 29.30 | 25.80 | 22.30 | 19.30 |
| Glycerine | 10.00 | 10.00 | 10.00 | 10.00 |
| Diethylene Glycol | 5.00 | 3.50 | 2.00 | — |
| Proxel GXL | 0.15 | 0.15 | 0.15 | 0.15 |
| Dynwet 800N | 0.05 | 0.05 | 0.05 | 0.05 |
| Triethanolamine | 0.50 | 0.50 | 0.50 | 0.50 |
| Impranil DLH (40%) | 25.00 | 25.00 | 25.00 | 25.00 |
| Sun DSYL54PDS172 (16%) | 30.00 | 30.00 | 30.00 | 30.00 |
| Kodak A1 Yellow | — | 5.00 | 10.00 | 15.00 |

Table 5, below, provides the testing results of color density and colorfastness for each sample of the second set of samples (i.e., the same samples provided in Table 6), according to some embodiments. As shown in Table 5, each sample of Table 4 was direct-printed onto cotton textile without pre-treatment of cotton. Color was tested using ASTM D2244-16, colorfastness was tested using AATCC 61, Crock Wet was tested using AATCC 8, Crock Dry was tested using AATCC 8, and Fabric Hand was tested using AATCC 5.

TABLE 5

Color and colorfastness results for each sample of Table 6 direct-printed onto cotton textile without pre-treatment of cotton.

| | | Sample 9 | Sample 10 | Sample 11 | Sample 12 |
|---|---|---|---|---|---|
| Color Measurement After Direct Printing and Heat Press 385 C. 40 s (L value) | Initial | 1.20 | 1.22 | 1.22 | 1.20 |
| | Wash 1 | 1.06 | 1.13 | 1.15 | 1.11 |
| | Wash 2 | 1.01 | 1.09 | 1.11 | 1.07 |
| | Wash 5 | 0.99 | 1.07 | 1.09 | 1.06 |
| Colorfastness Method 2 | ΔE Wash 1 | 5.7 | 3.3 | 2.4 | 3.2 |
| | ΔE Wash 3 | 7.2 | 4.9 | 4.3 | 4.6 |
| | ΔE Wash 5 | 8.4 | 5.9 | 4.5 | 4.6 |
| Crock Wet | | 3 | 3 | 2.5 | 1.5 |
| Crock Dry | | 4-5 | 4-5 | 4-5 | 4-5 |
| Fabric Hand | | 4 | 4 | 4 | 4 |

The results shown in Table 5 indicate that colorfastness and thus washability improves with addition of a water-based pigment dispersion to the pigment composition of the dye sublimation ink composition. For example, as shown in Table 5, Sample 9 (the control sample), which includes a pigment composition that includes only a dye sublimation dispersion, yields a delta E value of above 8 after 5 washes. However, Sample 10, which includes a pigment composition that includes both a dye sublimation dispersion and a water-based pigment dispersion, yields a delta E value of below 8 after 5 washes.

Table 6, below, provides the composition of four different dye sublimation ink compositions for a third set of samples (Samples 13-16). Samples 13-16 include different amounts of a cross-linking agent to cross-link polyurethane as well as graft the polyurethane to the cotton and form a film on the surface of the fabric that prevents any type of pigment (such as Sun DSYL54PDS172 (16%)) and/or Kodak A1 Yellow) from coming off the fabric. Sample 13 is a control sample for assessing dye sublimation ink compositions performance that include a cross-linking agent (Samples 14-16) versus dye sublimation ink composition comprising no cross-linking agent (Sample 13). Samples 14-16 include an amount of cross-linking agent (Imprafix 2794 XP). Imprafix 2794 XP is a dispersed blocked isocyanate.

TABLE 6

Composition of each sample of the third sample set. Each sample includes a different amount of cross-linking agent.

| Component | Sample 13 | Sample 14 | Sample 15 | Sample 16 |
|---|---|---|---|---|
| DI Water | 22.30 | 22.05 | 22.30 | 20.30 |
| Glycerine | 14.00 | 14.00 | 14.00 | 14.00 |
| Diethylene Glycol | 10.00 | 9.00 | 5.00 | 2.00 |
| Proxel GXL | 0.15 | 0.15 | 0.15 | 0.15 |
| Dynwet 800N | 0.05 | 0.05 | 0.05 | 0.05 |
| Triethanolamine | 0.50 | 0.50 | 0.50 | 0.50 |
| Impranil DLH (40%) | 15.00 | 15.00 | 15.00 | 15.00 |
| Imprafix 2794 XP | — | 1.25 | 5.00 | 10.00 |
| Sun DSYL54PDS172 (16%) | 23.00 | 23.00 | 23.00 | 23.00 |
| Kodak A1 Yellow | 15.00 | 15.00 | 15.00 | 15.00 |

Table 7, below, provides the testing results of color density and colorfastness for each sample of the third set of samples (i.e., the same samples provided in Table 6), according to some embodiments. As shown in Table 7, each sample of Table 6 was direct-printed onto cotton textile without pre-treatment of cotton. Color was tested using ASTM D2244-16, colorfastness was tested using AATCC 61, Crock Wet was tested using AATCC 8, and Crock Dry was tested using AATCC 8.

TABLE 7

Color and colorfastness results for each sample of Table 8 direct-printed onto cotton textile without pre-treatment of cotton.

| | | Sample 13 | Sample 14 | Sample 15 | Sample 16 |
|---|---|---|---|---|---|
| Color Measurement After Direct Printing and Heat Press 385 C. 40 s (L value) | Initial | 1.20 | 1.23 | 1.21 | 1.21 |
| | Wash 1 | 1.12 | 1.16 | 1.17 | 1.16 |
| | Wash 2 | 1.06 | 1.12 | 1.15 | 1.13 |
| | Wash 5 | 1.03 | 1.09 | 1.13 | 1.12 |
| Colorfastness Method 2 | ΔE Wash 1 | 2.2 | 1.9 | 1.1 | 1.4 |
| | ΔE Wash 3 | 5.3 | 3.4 | 2.0 | 2.0 |
| | ΔE Wash 5 | 6.1 | 5.1 | 3.0 | 2.6 |
| Crock Wet | | 2 | 2.5 | 3 | 3.5 |
| Crock Dry | | 4 | 4 | 4-5 | 4-5 |

The results shown in Table 7 indicate that colorfastness and thus washability improves with addition of a crosslinking agent. For example, as shown in Table 7, Sample 13 (the control sample), which includes no cross-linking agent, yields a delta E value of above 6 after 5 washes. However, Sample 14, which includes a first amount of cross-linking agent, yields a delta E value of below 6 after 5 washes. Sample 15, which includes more cross-linking agent than Sample 14, yields a delta E value of less than 4 after 5 washes.

Market Comparison

Provided below is a description of testing that was performed to test dye sublimation ink compositions disclosed herein and commercially available products that are related to the dye sublimation ink compositions provided herein. In particular, the commercially available products used in this analysis were Standard Dye Sub Inks, Hanrun®, Sublilight, TopCut, Top Dark New, Forever, and Texmax In the industry, a standard dye sub ink is used for printing on polyester, Texmax is used for printing on cotton. Texmax PT has a pretreatment applied to the cotton specifically for this ink. In the industry, Hanrun®, Sublilight, are sheets that are used with dye sublimation inks to apply to cotton, while Top Cut, Top Dark New, and Forever are companies that produce sheets for toners that can be applied specifically to cotton. Table 8 provides the amounts used in each dye sublimation ink composition in each sample. Tables 9-12, according to some embodiments, provide test result for market comparison for printing directly onto a natural fiber (cotton). Tables 13-16, according to some embodiments, provide test results for market comparisons for printing directly or transferring onto a synthetic fiber (polyester). Tables 9-16 show that the dye sublimation ink compositions disclosed herein perform just as well as commercially available products made just printing onto polyester and works just as well as commercially available products made just for printing onto cotton.

That is, the dye sublimation ink compositions disclosed herein allows a user to use a dye sublimation ink composition disclosed herein for printing on both natural fibers (such as cotton, wool, etc.) and synthetic fibers (such as polyester, nylon, etc.).

TABLE 8

Dye Sublimation Ink Compositions Used in Market Analysis.

| COMPONENT | Sample 17-Cyan | Sample 18-Magenta | Sample 19-Yellow | Sample 20-Black |
|---|---|---|---|---|
| DI Water | 31.30 | 16.55 | 21.30 | 22.04 |
| Glycerine | 10.00 | 10.00 | 10.00 | 14.00 |
| DEG | 4.00 | — | — | — |
| Imprafix 2794 XP | 5.00 | 10.00 | 10.00 | 10.00 |
| Impranil DLH | 20.00 | 20.00 | 20.00 | 20.00 |
| GXL | 0.15 | 0.15 | 0.15 | 0.15 |
| DW800 | 0.05 | 0.05 | 0.05 | 0.05 |
| TEA | 0.50 | 0.25 | 0.50 | 0.50 |
| Kodak A1 Cyan | 5.00 | — | — | 2.00 |
| Kodak A1 Magenta | — | 15.00 | — | — |
| Kodak A1 Yellow | — | — | 15.00 | — |
| Kodak A1 Black | — | — | — | 8.00 |
| Sun Cyan 359 | 24.00 | — | — | 2.74 |
| Sun 60 | — | 28.00 | — | — |
| Sun Yellow 54 | — | — | 23.00 | — |
| Sun Black 40 | — | — | — | 20.52 |
| TOTAL | 100.00 | 100.00 | 100.00 | 100.00 |

The colorfast method used for each of the compositions tested in the market analysis was Method 2 for Tables 9-12. Tables 9-12, provided below, shows the testing results of fabric hand, color density, and colorfastness for each sample direct printed onto cotton without pre-treatment of cotton for cyan, magenta, yellow, and black dyes. Color was tested using ASTM D2244-16, and colorfastness was tested using AATCC 61 Method 2 for direct print samples.

TABLE 9

Ink color density, colorfastness, and fabric hand results of commercially available products and Sample 17 for cyan color.

| | | Cyan | | | | | | | | |
|---|---|---|---|---|---|---|---|---|---|---|
| | | Dye Sub Standard | Hanrun ® | Subilight | Top Cut | Top Dark New | Forever | Texmax | Texmax PT | Sample 17 |
| Color Measurement After Direct Printing and Heat Press 385 C. 40 s (L value) | Initial | 0.82 | 1.21 | 1.38 | 1.08 | 1.2 | 1.17 | 1.07 | 1.13 | 1.06 |
| | Wash 1 | 0.58 | 1.09 | 1.19 | 0.97 | 1.19 | 1.11 | 1.04 | 1.13 | 1.04 |
| | Wash 2 | 0.48 | 1.04 | 1.02 | 0.89 | 1.06 | 0.97 | 0.99 | 1.14 | 1 |
| | Wash 5 | 0.44 | 0.98 | 0.98 | 0.74 | 1.05 | 0.87 | 0.95 | 1.1 | 0.99 |
| Colorfastness Method 2 | ΔE Wash 1 | 13.9 | 10.1 | 6.8 | 5.1 | 3.4 | 4.1 | 2.5 | 1.6 | 2.7 |
| | ΔE Wash 3 | 19.4 | 18.5 | 19.2 | 10.8 | 5.6 | 7.4 | 4.8 | 2.2 | 4.6 |
| | ΔE Wash 5 | 22 | 24.8 | 22.3 | 17.5 | 6.2 | 11.3 | 6.4 | 4.2 | 5.1 |
| Crock Wet | | 2-3 | 3-4 | 5 | 5 | 5 | 5 | 2-3 | 3 | 3 |
| Crock Dry | | 4 | 5 | 5 | 5 | 5 | 5 | 4 | 3-4 | 4 |
| Fabric Hand | | 5 | 1 | 1 | 1 | 1 | 1 | 5 | 4 | 5 |

TABLE 10

Ink color density, colorfastness, and fabric hand results of commercially available products and Sample 18 for magenta color.

| | | Magenta | | | | | | | | |
|---|---|---|---|---|---|---|---|---|---|---|
| | | Dye Sub Standard | Hanrun | Subilight | Top Cut | Top Dark New | Forever | Texmax | Texmax PT | Sample 18 |
| Color Measurement After Direct Printing and Heat Press 385 C. 40 s (L value) | Initial | 0.94 | 1.1 | 1.3 | 1.06 | 1.19 | 1.12 | 0.94 | 0.96 | 1.04 |
| | Wash 1 | 0.5 | 0.98 | 1.23 | 0.94 | 1.15 | 1.02 | 0.91 | 0.97 | 1 |
| | Wash 2 | 0.35 | 0.92 | 1.09 | 0.78 | 1.09 | 0.86 | 0.86 | 0.98 | 0.98 |
| | Wash 5 | 0.32 | 0.88 | 1.12 | 0.67 | 0.99 | 0.77 | 0.83 | 0.96 | 0.95 |
| Colorfastness Method 2 | ΔE Wash 1 | 28.4 | 12.6 | 4.2 | 8.4 | 4.7 | 9.4 | 2.5 | 4.5 | 5.8 |
| | ΔE Wash 3 | 38.7 | 21.7 | 10.9 | 22.6 | 5.7 | 15.6 | 4.8 | 4.9 | 6.3 |
| | ΔE Wash 5 | 41.5 | 27.3 | 10.8 | 30.4 | 10.8 | 21.7 | 6.4 | 5.9 | 7 |
| Crock Wet | | 2-3 | 3-4 | 5 | 5 | 5 | 5 | 2-3 | 3 | 2-3 |
| Crock Dry | | 3 | 5 | 5 | 5 | 5 | 5 | 4-5 | 4 | 4 |
| Fabric Hand | | 5 | 1 | 1 | 1 | 1 | 1 | 5 | 4 | 5 |

TABLE 11

Ink color density, colorfastness, and fabric hand results of commercially available products and Sample 19 for yellow color.

| | | Yellow | | | | | | | | |
|---|---|---|---|---|---|---|---|---|---|---|
| | | Dye Sub Standard | Hanrun | Subilight | Top Cut | Top Dark New | Forever | Texmax | Texmax PT | Sample 19 |
| Color Measurement After Direct Printing and Heat Press 385 C. 40 s (L value) | Initial | 0.93 | 1.35 | 1.48 | 1.16 | 1.25 | 1.18 | 0.98 | 1.06 | 1.08 |
| | Wash 1 | 0.63 | 1.22 | 1.24 | 0.95 | 1.2 | 1.06 | 0.95 | 1.07 | 1 |
| | Wash 2 | 0.49 | 1.21 | 1.07 | 0.89 | 1.14 | 0.86 | 0.9 | 1.05 | 1.06 |
| | Wash 5 | 0.45 | 1.12 | 1 | 0.74 | 0.96 | 0.77 | 0.88 | 1.03 | 1.04 |
| Colorfastness Method 2 | ΔE Wash 1 | 25.5 | 13.2 | 10.2 | 11.9 | 6.4 | 11.5 | 8.9 | 8 | 8.4 |
| | ΔE Wash 3 | 32.3 | 20.8 | 22.6 | 28.8 | 8.4 | 20.6 | 11.9 | 11.1 | 9.8 |
| | ΔE Wash 5 | 34.7 | 31.3 | 26 | 39.8 | 18.6 | 27.7 | 12.9 | 12.4 | 9.9 |
| Crock Wet | | 2 | 3-4 | 4-5 | 5 | 5 | 5 | 3 | 3 | 3 |
| Crock Dry | | 4 | 5 | 5 | 5 | 5 | 5 | 4-5 | 4-5 | 4-5 |
| Fabric Hand | | 5 | 1 | 1 | 1 | 1 | 1 | 5 | 4 | 5 |

TABLE 12

Ink color density, colorfastness, and fabric hand results of commercially available products and Sample 20 for black color.

| | | Black | | | | | | | | |
|---|---|---|---|---|---|---|---|---|---|---|
| | | Dye Sub Standard | Hanrun | Subilight | Top Cut | Top Dark New | Forever | Texmax | Texmax PT | Sample 20 |
| Color Measurement After Direct Printing and Heat Press 385 C. 40 s (L value) | Initial | 0.83 | 1.04 | 1.16 | 1.23 | 1.22 | 1.28 | 1.1 | 1.13 | 1.08 |
| | Wash 1 | 0.56 | 0.94 | 1.01 | 0.99 | 1.11 | 1.16 | 1.04 | 1.13 | 1.03 |
| | Wash 2 | 0.49 | 0.86 | 0.95 | 0.92 | 1.14 | 0.99 | 0.98 | 1.11 | 0.99 |
| | Wash 5 | 0.46 | 0.81 | 0.88 | 0.8 | 0.99 | 0.91 | 0.93 | 1.1 | 0.97 |
| Colorfastness Method 2 | ΔE Wash 1 | 15.2 | 4.3 | 5.9 | 10.8 | 4.3 | 5.2 | 2.6 | 0.4 | 1.9 |
| | ΔE Wash 3 | 24.7 | 8.3 | 10.4 | 12.6 | 3.3 | 11.3 | 5.1 | 1 | 3.5 |
| | ΔE Wash 5 | 25.9 | 10.9 | 13.8 | 17.8 | 9 | 14.6 | 7.2 | 1.3 | 4.5 |

TABLE 12-continued

Ink color density, colorfastness, and fabric hand results of commercially available products and Sample 20 for black color.

| | Black | | | | | | | | |
|---|---|---|---|---|---|---|---|---|---|
| | Dye Sub Standard | Hanrun | Subilight | Top Cut | Top Dark New | Forever | Texmax | Texmax PT | Sample 20 |
| Crock Wet | 2-3 | 5 | 5 | 5 | 5 | 5 | 2 | 2-3 | 2 |
| Crock Dry | 3 | 5 | 5 | 5 | 5 | 5 | 4-5 | 4 | 4 |
| Fabric Hand | 5 | 1 | 1 | 1 | 1 | 1 | 5 | 4 | 5 |

As described above, the color measurement of a printed image is the measurement of the color density, or amount of dye transfer. A smaller number (L value) indicates a darker shade and more dye transfer, whereas a larger L value indicates a lighter shade and less dye transfer. As shown in Tables 9-12, the color measurements for each color tested—cyan, magenta, yellow, and black for the dye sublimation inks disclosed herein were higher than one or more of the commercially available products. In some embodiments, the initial color measurement of a direct print sample with a dye sublimation ink composition disclosed herein for cyan dye (Sample 17), magenta dye (Sample 18), yellow dye (Sample 19), and black dyes (Sample 20) was less than 2.5, less than 2, or less than 1.5. In some embodiments, the initial color measurement of a direct print sample with a dye sublimation ink composition disclosed herein for cyan dye (Sample 17), magenta dye (Sample 18), yellow dye (Sample 19), and black dye (Sample 20) was more than 0.2, more than 0.6, more than 0.9, or more than 1. In some embodiments, color measurement after 5 washes of a direct print sample with a dye sublimation ink composition disclosed herein for cyan dye (Sample 17), magenta dye (Sample 18), yellow dye (Sample 19), and black dye (Sample 20) was less than 2.5, less than 2, or less than 1.5. In some embodiments, the color measurement after 5 washes of a direct print sample with a dye sublimation ink composition disclosed herein for cyan dye (Sample 17), magenta dye (Sample 18), yellow dye (Sample 19), and black dye (Sample 20) was more than 0.2, more than 0.5, more than 0.8, or more than 0.9.

The colorfastness test results of Tables 9-12 that the dye sublimation inks disclosed herein exhibited a smaller color change and thus, better colorfastness results compared to one or more of the commercially available products. The results are reported as delta E ($\Delta E$) values, which is the color difference between the original L a*b* values measured before laundering and after the five washes. In some embodiments, a dye sublimation ink composition for a cyan dye disclosed herein tested $\Delta E$ of less than 10, less than 8, or less than 6. In some embodiments, a dye sublimation ink composition for a cyan dye disclosed herein tested $\Delta E$ of greater than 0.5, greater than 1, or greater than 2. In some embodiments, a dye sublimation ink composition for a magenta dye disclosed herein tested $\Delta E$ of less than 12, less than 10 or less than 8. In some embodiments, a dye sublimation ink composition for a magenta dye disclosed herein tested $\Delta E$ of greater than 1, greater than 3, or greater than 5. In some embodiments, a dye sublimation ink composition for a yellow dye disclosed herein tested $\Delta E$ of less than 14, less than 12 or less than 10. In some embodiments, a dye sublimation ink composition for a yellow dye disclosed herein tested $\Delta E$ of greater than 4, greater than 6, or greater than 8. In some embodiments, a dye sublimation ink composition for a black dye disclosed herein tested $\Delta E$ of less than 10, less than 8, or less than 6. In some embodiments, a dye sublimation ink composition for a black dye disclosed herein tested $\Delta E$ of greater than 0.5, greater than 1, or greater than 2.

According to some embodiments, the Crock Wet, Crock Dry, and Fabric Hand test results of Tables 9-12 show acceptable results for industry. In some embodiments, a dye sublimation ink composition for cyan dye disclosed herein tested Crock Wet, Crock Dry, and Fabric Hand test results are between 2 and 5. In some embodiments, a dye sublimation ink composition for magenta dye disclosed herein tested Crock Wet, Crock Dry, and Fabric Hand test results are between 2 and 5. In some embodiments, a dye sublimation ink composition for yellow dye disclosed herein tested Crock Wet, Crock Dry, and Fabric Hand test results are between 2 and 5. In some embodiments, a dye sublimation ink composition for black dye disclosed herein tested Crock Wet, Crock Dry, and Fabric Hand test results are between 2 and 5.

The colorfast method used for each of the compositions tested in the market analysis were Methods 1 and 2. Tables 13-16, provided below, shows the testing results of fabric hand, color density, and colorfastness for each sample printed directly or transferred onto polyester for cyan, magenta, yellow, and black dyes. Color was tested using ASTM D2244-16, and colorfastness was tested using AATCC 61 Method 2 for direct print and Method 1 for transfer print samples.

TABLE 13

Ink color density, colorfastness, and fabric hand results of commercially available products and Sample 17 for cyan color.

| | | Transfer Print Dye Sub Standard | Transfer Print Sample 17 | Direct Print Dye Sub Standard | Direct Print Texmax | Direct Print Texmax PT Poly | Direct Print Sample 17 |
|---|---|---|---|---|---|---|---|
| Color Measurement After Printing and Heat Press | Initial | 1.29 | 1.31 | 1.23 | 0.88 | 1.08 | 1.39 |
| | Wash 1 | 1.35 | 1.36 | 1.23 | 0.78 | 0.98 | 1.37 |
| | Wash 2 | 1.32 | 1.34 | 1.23 | 0.73 | 0.95 | 1.34 |

TABLE 13-continued

Ink color density, colorfastness, and fabric hand results of commercially available products and Sample 17 for cyan color.

|  |  | Transfer Print Dye Sub Standard | Transfer Print Sample 17 | Direct Print Dye Sub Standard | Direct Print Texmax | Direct Print Texmax PT Poly | Direct Print Sample 17 |
|---|---|---|---|---|---|---|---|
| 385 C. 40 s (L value) | Wash 5 | 1.34 | 1.34 | 1.22 | 0.72 | 0.9 | 1.36 |
| Colorfastness Method 1/2 | ΔE Wash 1 | 3.1 | 1.4 | 1.7 | 4.3 | 3.7 | 1.7 |
|  | ΔE Wash 3 | 4.5 | 4.3 | 2.3 | 6.4 | 5 | 5.2 |
|  | ΔE Wash 5 | 4.1 | 4.2 | 2.4 | 6.8 | 7 | 4.2 |
| Crock Wet |  | 5 | 5 | 5 | 2-3 | 2-3 | 2-3 |
| Crock Dry |  | 5 | 4-5 | 5 | 4-5 | 4-5 | 4-5 |
| Fabric Hand |  | 5 | 5 | 4 | 4 | 4 | 4 |

TABLE 14

Ink color density, colorfastness, and fabric hand results of commercially available products and Sample 18 for magenta color.

|  |  | Transfer Print Dye Sub Standard | Transfer Print Sample 18 | Direct Print Dye Sub Standard | Direct Print Texmax | Direct Print Texmax PT Poly | Direct Print Sample 18 |
|---|---|---|---|---|---|---|---|
| Color Measurement | Initial | 1.32 | 1.22 | 1.14 | 0.86 | 0.88 | 1.45 |
| After Printing | Wash 1 | 1.34 | 1.24 | 1.13 | 0.76 | 0.82 | 1.45 |
| and Heat Press | Wash 2 | 1.34 | 1.33 | 1.15 | 0.71 | 0.8 | 1.46 |
| 385 C. 40 s (L value) | Wash 5 | 1.29 | 1.28 | 1.14 | 0.69 | 0.78 | 1.41 |
| Colorfastness Method 1/2 | ΔE Wash 1 | 1.3 | 0.8 | 1 | 6.2 | 3.2 | 1.4 |
|  | ΔE Wash 3 | 2 | 6.5 | 1.8 | 8.9 | 4.3 | 3.5 |
|  | ΔE Wash 5 | 1.2 | 2.6 | 1.4 | 10.5 | 5.9 | 2.8 |
| Crock Wet |  | 5 | 5 | 5 | 2-3 | 3 | 3 |
| Crock Dry |  | 4 | 4 | 5 | 4-5 | 4 | 4-5 |
| Fabric Hand |  | 5 | 5 | 4 | 4 | 4 | 4 |

TABLE 15

Ink color density, colorfastness, and fabric hand results of commercially available products and Sample 19 for yellow color.

|  |  | Transfer Print Dye Sub Standard | Transfer Print Sample 19 | Direct Print Dye Sub Standard | Direct Print Texmax | Direct Print Texmax PT Poly | Direct Print Sample 19 |
|---|---|---|---|---|---|---|---|
| Color Measurement | Initial | 1.36 | 1.35 | 1.44 | 0.896 | 1.02 | 1.5 |
| After Printing | Wash 1 | 1.416 | 1.37 | 1.47 | 0.8 | 0.91 | 1.5 |
| and Heat Press | Wash 2 | 1.41 | 1.38 | 1.44 | 0.76 | 0.87 | 1.52 |
| 385 C. 40 s (L value) | Wash 5 | 1.4 | 1.4 | 1.45 | 0.71 | 0.85 | 1.49 |
| Colorfastness Method 1/2 | ΔE Wash 1 | 2.2 | 1.4 | 1.7 | 6.4 | 6.1 | 2.9 |
|  | ΔE Wash 3 | 3 | 2.2 | 3.1 | 10 | 8.2 | 6.5 |
|  | ΔE Wash 5 | 2.2 | 2.2 | 2.7 | 13.4 | 10 | 5.8 |
| Crock Wet |  | 5 | 4-5 | 5 | 3 | 2-3 | 3 |
| Crock Dry |  | 4-5 | 4-5 | 4-5 | 4-5 | 4-5 | 4-5 |
| Fabric Hand |  | 5 | 5 | 4 | 4 | 4 | 4 |

TABLE 16

Ink color density, colorfastness, and fabric hand results of commercially available products and Sample 20 for black color.

| | | Transfer Print Dye Sub Standard | Transfer Print Sample 20 | Direct Print Dye Sub Standard | Direct Print Texmax | Direct Print Texmax PT Poly | Direct Print Sample 20 |
|---|---|---|---|---|---|---|---|
| Color Measurement After Printing and Heat Press 385 C. 40 s (L value) | Initial | 1.29 | 1.29 | 1.03 | 1.12 | 1.06 | 1.45 |
| | Wash 1 | 1.3 | 1.31 | 1.04 | 0.99 | 0.91 | 1.42 |
| | Wash 2 | 1.29 | 1.29 | 1.03 | 0.94 | 0.87 | 1.41 |
| | Wash 5 | 1.3 | 1.28 | 1.02 | 0.86 | 0.86 | 1.37 |
| Colorfastness Method 1/2 | ΔE Wash 1 | 0.4 | 0.8 | 0.7 | 4.9 | 6.8 | 0.8 |
| | ΔE Wash 3 | 0.1 | 0.9 | 0.2 | 7.2 | 8.3 | 1.1 |
| | ΔE Wash 5 | 0.3 | 0.9 | 0.4 | 10.5 | 8.9 | 2.3 |
| Crock Wet | | 5 | 5 | 5 | 2-3 | 2 | 2-3 |
| Crock Dry | | 4 | 4-5 | 5 | 4-5 | 4-5 | 4-5 |
| Fabric Hand | | 5 | 5 | 4 | 4 | 4 | 4 |

As described above, the color measurement of a printed image is the measurement of the color density, or amount of dye transfer. A smaller number (L value) indicates a darker shade and more dye transfer, whereas a larger L value indicates a lighter shade and less dye transfer. As shown in Tables 13-16, the color measurements for each color tested—cyan, magenta, yellow, and black for the dye sublimation inks disclosed herein were higher than one or more of the commercially available products. In some embodiments, the initial color measurement of a direct print sample with a dye sublimation ink composition disclosed herein for cyan dye (Sample 17), magenta dye (Sample 18), yellow dye (Sample 19), and black dyes (Sample 20) was less than 2.5, less than 2, or less than 1.5. In some embodiments, the initial color measurement of a direct print sample with a dye sublimation ink composition disclosed herein for cyan dye (Sample 17), magenta dye (Sample 18), yellow dye (Sample 19), and black dye (Sample 20) was more than 0.4, more than 0.6, more than 0.8, or more than 1. In some embodiments, color measurement after 5 washes of a direct print sample with a dye sublimation ink composition disclosed herein for cyan dye (Sample 17), magenta dye (Sample 18), yellow dye (Sample 19), and black dye (Sample 20) was less than 2.5, less than 2, or less than 1.5. In some embodiments, the color measurement after 5 washes of a direct print sample with a dye sublimation ink composition disclosed herein for cyan dye (Sample 17), magenta dye (Sample 18), yellow dye (Sample 19), and black dye (Sample 20) was more than 0.4, more than 0.6, more than 0.8, or more than 1.

The colorfastness test results of Tables 13-16 show that the dye sublimation inks disclosed herein exhibited a smaller color change and thus, better colorfastness results compared to one or more of the commercially available products. The results are reported as delta E (ΔE) values, which is the color difference between the original L a*b* values measured before laundering and after the five washes. In some embodiments, a dye sublimation ink composition for a cyan dye disclosed herein tested ΔE of less than 8, less than 6, or less than 5. In some embodiments, a dye sublimation ink composition for a cyan dye disclosed herein tested ΔE of greater than 0.4, greater than 0.6, or greater than 1. In some embodiments, a dye sublimation ink composition for a magenta dye disclosed herein tested ΔE of less than 8, less than 6 or less than 4. In some embodiments, a dye sublimation ink composition for a magenta dye disclosed herein tested ΔE of greater than 0.5, greater than 0.8, or greater than 1. In some embodiments, a dye sublimation ink composition for a yellow dye disclosed herein tested ΔE of less than 10, less than 8 or less than 6. In some embodiments, a dye sublimation ink composition for a yellow dye disclosed herein tested ΔE of greater than 0.5, greater than 1, or greater than 2. In some embodiments, a dye sublimation ink composition for a black dye disclosed herein tested ΔE of less than 7, less than 5, or less than 3. In some embodiments, a dye sublimation ink composition for a black dye disclosed herein tested ΔE of greater than 0.2, greater than 0.4, or greater than 0.6.

According to some embodiments, the Crock Wet, Crock Dry, and Fabric Hand test results of Tables 13-16 show acceptable results for industry. In some embodiments, a dye sublimation ink composition for cyan dye disclosed herein tested Crock Wet, Crock Dry, and Fabric Hand test results are between 2 and 5. In some embodiments, a dye sublimation ink composition for magenta dye disclosed herein tested Crock Wet, Crock Dry, and Fabric Hand test results are between 2 and 5. In some embodiments, a dye sublimation ink composition for yellow dye disclosed herein tested Crock Wet, Crock Dry, and Fabric Hand test results are between 2 and 5. In some embodiments, a dye sublimation ink composition for black dye disclosed herein tested Crock Wet, Crock Dry, and Fabric Hand test results are between 2 and 5. The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A dye sublimation ink composition for printing on a fabric comprising natural fibers, the composition comprising:
   5 to 40 wt. % one or more latexes; and
   a pigment composition comprising a dye sublimation dispersion and a water-based pigment dispersion.

2. The composition of claim 1, wherein the fabric comprises one or more of wool, cotton, silk, linen, leather, hemp, or bamboo.

3. The composition of claim 1, wherein the fabric comprises synthetic fibers.

4. The composition of claim 1, wherein the fabric comprises 0.05 to 0.5 grams of a liquid pretreatment composition per square inch of natural fiber fabric, wherein the pretreatment composition comprises:
   15 to 35 wt. % one or more latex polymers;
   0.5 to 5 wt. % coalescing agent composition;
   0.1 to 1 wt. % surfactant composition;
   0.1 to 1 wt. % ultraviolet (UV) stabilizer composition;
   0.5 to 5 wt. % antioxidant composition; and
   40 to 75 wt. % solvent.

5. The composition of claim 1, wherein the one or more latexes of the dye sublimation ink composition comprises one or more of a polyester, an acrylic, an aramid, a chlorinated polymer, an elastane, an elastodiene, a fluorinated polymer, a polyurethane, a polyvinyl chloride, a polyolefin, a polystyrene, an acrylonitrile butadiene styrene, a polyacetate, a polyamide, a polyethylene, a polyimide, a polyether, a polycarbonate, or a polyvinylalcohol.

6. The composition of claim 1, wherein the one or more latexes of the dye sublimation ink composition comprises a polyurethane latex.

7. The composition of claim 1, comprising 1 to 25 wt. % a humectant composition.

8. The composition of claim 7, wherein the humectant composition comprises one or more of dipropylene glycol, diethylene glycol, triethylene glycol, and glycerine.

9. The composition of claim 1, comprising 0.01 to 3 wt. % a surfactant composition.

10. The composition of claim 1, comprising 0.01 to 3 wt. % a biocide composition.

11. The composition of claim 1, comprising 0.1 to 3 wt. % a buffer composition.

12. The composition of claim 1, comprising 30 to 50 wt. % a solvent.

13. The composition of claim 1, wherein the pigment composition comprises one or more of a dye sublimation dispersion and one or more of a pigment dispersion.

14. The composition of claim 1, comprising a cross-linking agent.

15. A printed fabric having a dye sublimation ink-printed image comprising:
   a fabric comprising natural fibers; and
   a dye sublimation ink layer comprising:
      5 to 40 wt. % one or more latexes; and
      a pigment composition comprising a dye sublimation dispersion and a water-based pigment dispersion.

16. The printed fabric of claim 15, wherein the dye sublimation ink layer is formed from a liquid dye sublimation ink composition comprising:
   1 to 25 wt. % humectant composition;
   0.01 to 3 wt. % surfactant composition;
   0.01 to 3 wt. % biocide composition;
   0.1 to 3 wt. % buffer composition; and
   30 to 50 wt. % solvent.

17. The printed fabric of claim 15, wherein the fabric comprises one or more of wool, cotton, silk, linen, leather, hemp, or bamboo.

18. The printed fabric of claim 15, wherein the fabric comprises synthetic fibers.

19. The printed fabric of claim 15, wherein the fabric comprises 0.05 to 0.5 grams of a liquid pretreatment composition per square inch of natural fiber fabric, wherein the pretreatment composition comprises:
   15 to 35 wt. % one or more latex polymers;
   0.5 to 5 wt. % coalescing agent composition;
   0.1 to 1 wt. % surfactant composition;
   0.1 to 1 wt. % ultraviolet (UV) stabilizer composition;
   0.5 to 5 wt. % antioxidant composition; and
   40 to 75 wt. % solvent.

20. The printed fabric of claim 15, wherein the one or more latexes of the dye sublimation ink layer comprise one or more of a polyester, an acrylic, an aramid, a chlorinated polymer, an elastane, an elastodiene, a fluorinated polymer, a polyurethane, a polyvinyl chloride, a polyolefin, a polystyrene, an acrylonitrile butadiene styrene, a polyacetate, a polyamide, a polyethylene, a polyimide, a polyether, a polycarbonate, or a polyvinylalcohol.

21. The printed fabric of claim 20, wherein the one or more latexes comprise a polyurethane latex.

22. The printed fabric of claim 16, wherein the humectant composition comprises one or more of dipropylene glycol, diethylene glycol, triethylene glycol, and glycerine.

23. The printed fabric of claim 16, wherein the surfactant composition comprises an anionic or a nonionic surfactant.

24. The printed fabric of claim 16, wherein the biocide composition comprises an antimicrobial.

25. The printed fabric of claim 16, wherein the buffer solution comprises triethanol amine.

26. The composition of claim 15, wherein the pigment composition comprises one or more of a dye sublimation dispersion and one or more of a pigment dispersion.

27. The composition of claim 15, wherein the dye sublimation ink layer comprises a cross-linking agent.

* * * * *